United States Patent [19]

Campbell et al.

[11] Patent Number: 5,373,550
[45] Date of Patent: Dec. 13, 1994

[54] TRANSMISSION OF CHECK IMAGES BY WAY OF A PUBLIC SWITCHED TELEPHONE NETWORK

[75] Inventors: Walter G. Campbell, Flemington; Charles J. Garland, Randolph; David A. Hollowell, Morristown; Robert Orleanski, Pittstown; Carol A. Wegrzynowicz, Holmdel, all of N.J.

[73] Assignee: AT&T Corp., Murray Hill, N.J.

[21] Appl. No.: 959,588

[22] Filed: Oct. 13, 1992

[51] Int. Cl.⁵ ............................................. H04M 11/00
[52] U.S. Cl. .................................... 379/100; 364/408; 235/379
[58] Field of Search ...................... 379/100, 53, 91, 96, 379/97, 98, 93; 364/408, 401, 400; 235/379; 340/825.3, 825.35; 358/85

[56] References Cited

U.S. PATENT DOCUMENTS

| | | | |
|---|---|---|---|
| 4,823,264 | 4/1989 | Deming | 364/408 |
| 4,960,981 | 10/1990 | Benton et al. | 364/408 |
| 5,122,950 | 6/1992 | Benton et al. | 364/408 |
| 5,159,548 | 10/1992 | Caslavka | 364/408 |
| 5,175,682 | 12/1992 | Higashiyama et al. | 364/408 |

OTHER PUBLICATIONS

T. Seeberg, "Advanced Document Processing at the Union Bank of Norway," IMC Journal, Second Quarter 1983, pp. 23-25.
D. W. Coyle et al., "Beyond the Hype—Character Recognition and Check Image Processing," Bank Management, May 1991, pp. 30-36.
P. Haas, "Why Image Processing Is Banking's Next Strategic System," Banking Software Review, Spring 1988, pp. 37-43.
J. J. Xenakis, "Imaging's Healthy Image," Information Week, Apr. 29, 1991, pp. 36, 40.
J. Wagner, "Sizing Up The Impact of Image Processing," Computers in Banking, Jun. 1989, pp. 22, 68.

Primary Examiner—Curtis Kuntz
Assistant Examiner—Stella L. Woo
Attorney, Agent, or Firm—Eugene S. Indyk; Stuart H. Mayer

[57] ABSTRACT

Checks used to effectuate commercial and private transactions may be cleared through the banking system by transporting images of those checks between sending institutions and receiving institutions in forward and reverse flow paths between banks of first deposit and payor banks. The check images are transported through a public switched telephone network which contains a special check imaging node which provides a network based check clearing service for customers of telephone network. The check imaging node receives images of checks from institutions which subscribe to this service and routes those images through the telephone network to intended subscriber and non-subscriber recipients. Transmission of check images through a public switched telephone network may completely replace existing check clearance procedures or may be used in conjunction with existing procedures.

16 Claims, 2 Drawing Sheets

TRANSMISSION OF CHECK IMAGES BY WAY OF A PUBLIC SWITCHED TELEPHONE NETWORK

TECHNICAL FIELD

This application relates to imaging. More specifically, this application relates to transporting images of checks between banking institutions and the like by way of a public switched telephone network.

BACKGROUND

Many commercial transactions involve payment for goods or services by way of a check. A check directs a bank (the payor bank), with which one party (the payor) has a checking account, to pay another party (the payee) a specified sum of money from that checking account. The payee then deposits the check in his or her bank, which is usually referred to as the bank of first deposit (BOFD). The BOFD, which is usually not the payor bank, then endorses the check, provisionally credits the depositor's account with the amount of the check, and either deposits the check directly with the payor bank or deposits the check indirectly with the payor bank through one or more intermediaries, such as one or more Federal Reserve Banks or other banks or check clearinghouses. When the check arrives at the payor bank, it may be honored by the payor bank which then debits the account of the payor in accordance with the amount of the check. It may also be dishonored by the payor bank in which case the check is returned to the BOFD either directly or indirectly through the same or different intermediaries which were involved in the transfer of the check from the BOFD to the payor bank.

This process involves actual physical transfer of the check from institution to institution in the path between the BOFD and the payor bank. This is a costly labor intensive process subject to a great deal of human error. In addition to high cost and opportunities for error, there also is a significant time delay between the presentation of a check at a BOFD and the arrival of that check at a payor bank. There also is an additional time delay involved before a BOFD can get notification that a payor bank has dishonored a check and is returning it to the BOFD. These time delays significantly enhance the financial risk to banking institutions involved in check clearance procedures. This is due to Federal banking regulations which require that funds be made available to the check depositor for withdrawal within a short time after check deposit.

SUMMARY

These problems associated with conventional check clearance procedures involving actual transfer of check between institutions can be solved by an apparatus and method involving transmitting images of checks between those institutions. These images are transmitted between institutions by way of a public telephone network.

In one example of the invention, a public switched telephone network contains a check clearance services node which receives an image of a check from a first institution involved in check clearance. The node determines the destination of the check from the image itself or from data stored in the node or data accompanying the image. The node routes the image to another institution via the public switched telephone network. One particularly important example of the invention involves receiving images of dishonored checks in a special node in a public switched telephone network and routing those images through the network to a bank of first deposit. Rapid notification to a bank of first deposit that a check has been dishonored by a payor bank is thereby achieved in this example of the invention.

DETAILED DESCRIPTION

Figure 1:
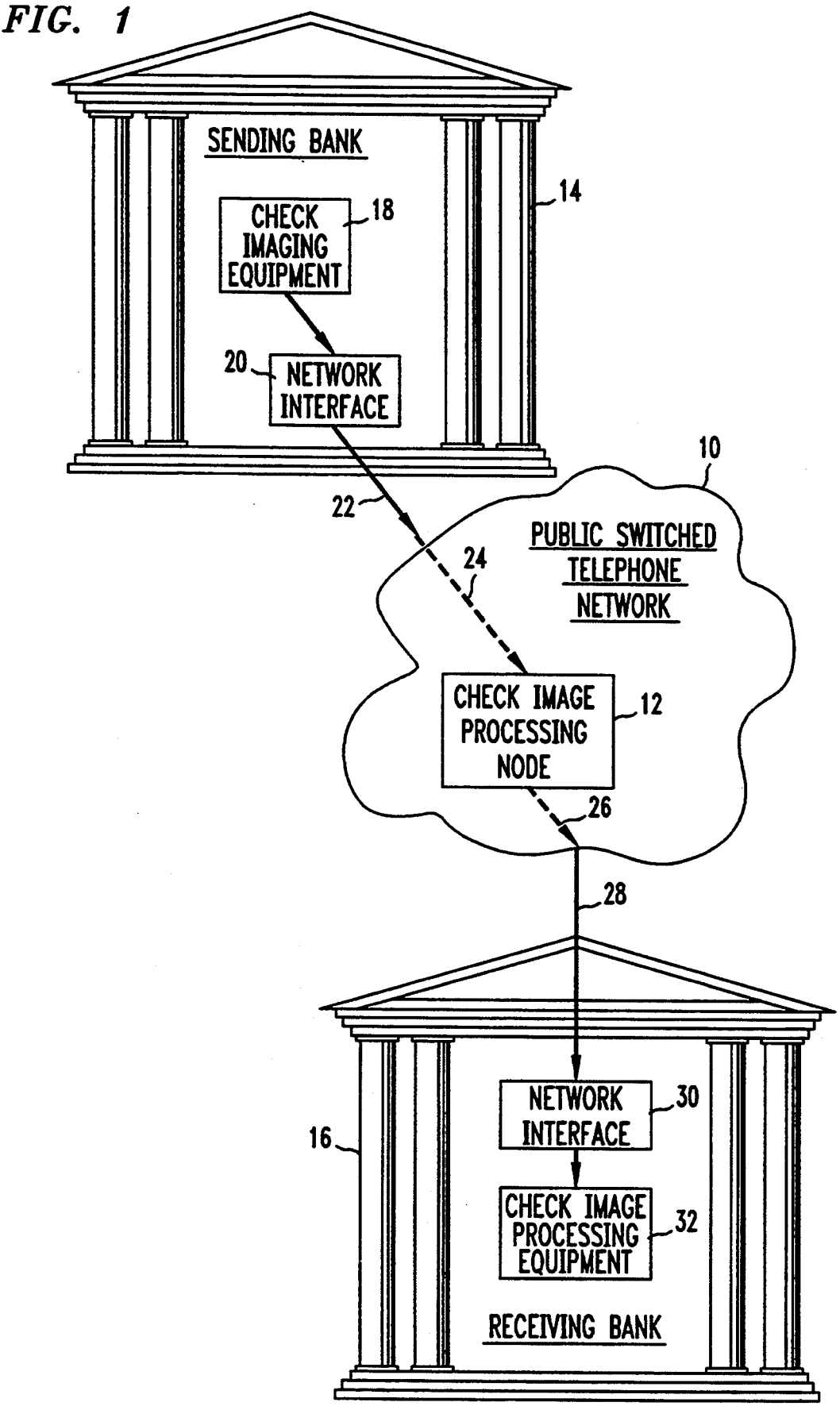
FIG. 1 is a schematic diagram of an example of a public switched telephone network in accordance with this invention.

FIG. 1 shows an example of a system for transporting images of checks through a public switched telephone network. The image of a check is created in a sending institution and sent to a receiving institution by means of the public switched telephone network. Check images may be handled in this manner to effectuate a check clearance procedure.

The system of FIG. 1 comprises a public switched telephone network 10. The network 10 contains at least one check image processing node 12 which provides check clearance services. The node 12 receives images of checks from a sending institution 14 transmitted through the network 10. The node 12 processes the check images and sends them to a receiving institution 16. The sending institution 14 is a subscriber to the telecommunications services provided by the node 12. The receiving institution 16 may or may not be a subscriber to the services of node 12. The sending institution 14 and the receiving institution 16 may be banks or other entities involved in a check clearing procedure. For example, the sending institution 14 may be a payor bank and the receiving institution may be a bank of first deposit which are involved in a processes of returning a check dishonored by institution 14 to the institution 16. Alternatively, the sending institution 14 may be a bank of first deposit which is in the process of forwarding checks to an institution 16 which is acting as a payor bank. One or both of institutions 14 and 16 may also be any intermediary institution in the forward and reverse check clearance flows between a bank of first deposit and a payor bank.

The public switched telephone network 10 may be a telephone network provided by a local exchange carrier such as one of the Regional Bell Operating Companies or it may be a telephone network provided by a long distance carrier such as AT&T. Another example of a public switched telephone network 10 is the combined network provided by a local exchange carrier and a long distance carrier. The network may be either electrically or optically based or may involve combinations of those two technologies. The network may be digital or analog. Two examples of suitable digital networks are a packet network and a frame relay network, such as the existing packet and frame relay networks now provided by carriers such as AT&T.

The sending institution 14 possesses check imaging equipment 18 which produces electrical or optical signals representing the image of a check. The image may comprise a sequence of signals each representing some characteristic of a picture element, for example, each signal may represent the intensity or color of light reflected from a small region on the front or back surface of a check. The check imaging equipment may be any device which can create suitable graphic image signals. For example, the imaging equipment may comprise systems which scan the front face, the back face or both the front and back faces of a check, as required, to create a series of intensity or color signals for each picture element making up the scanned surfaces of the check. The imaging equipment may be large multiworkstation systems available from companies such as IBM, UNISYS, or NCR. Alternatively, in smaller check clearing operations, the imaging equipment 18 may be personal computer based systems involving relatively simple video cameras and circuitry to digitize the signals from the camera.

The images produced by the equipment 18 are directed to a network interface 20 which converts the signals from the equipment 18 into signals suitable for transmission on the telephone network 10. The output of the network interface 20 is connected to one or more network access lines 22 in FIG. 1. The network access lines 22 may comprise any form of transmission line suitable for carrying the expected volume of check image traffic between the sending institution 14 and the telephone network 10. For example, the network access lines 22 may comprise one or more digital transmission lines operating at speeds of about 2400 bits per second to about 1.544 megabits per second or more. Connection to the network 10 may be by an ordinary dial up line or by a dedicated private line.

The signals received by the network on line 22 may be transmitted through the network 10 via one or more trunks and one or more central offices to the check image processing node 12 as represented schematically by a dotted line 24. The check image processing node 12 then routes the received check image via one or more trunks and one or more central offices, as represented schematically by a dotted line 26, to a network access line 28 of suitable capacity which may be the same as or different from the network access line 22. Check images are received in a network interface 30 in the receiving institution 16. The interface 30 transforms the signals from the network 10 into a form suitable for use by check image processing equipment 32 located in the receiving institution 16. The check image processing equipment 32 may be similar to the imaging equipment 18 located in the sending institution 14. The equipment 32 may also be facsimile equipment, character recognition equipment, e-mail systems, or any other image processing equipment by which the images received may be displayed or used by the receiving institution.

As described in more detail below in connection with the description of a specific example of the invention shown in FIG. 2, the processing node 12 receives check images and performs certain processing procedures on those images, including at least temporary storage of the received check images. One of the procedures performed on check images is to route them to a desired destination. The appropriate destination may be determined by the node 12 in a variety of ways. One example involves the sending institution 14 including destination identifying data along with the image. That data then can be read by the node 12 to appropriately route the check image to its destination. The destination identifying data may be manually entered by an operator at the time the image is generated in institution 14. The data may also be entered by character recognition equipment or the like in response to the image produced by equipment 18. One alternative to the sending institution producing data relating to the destination of the check image is to install character recognition equipment in the check image processing node 12. The character recognition in the node 12 then can read the check image and determine its destination from certain characteristics of the image such as the endorsements on the check.

Figure 2:
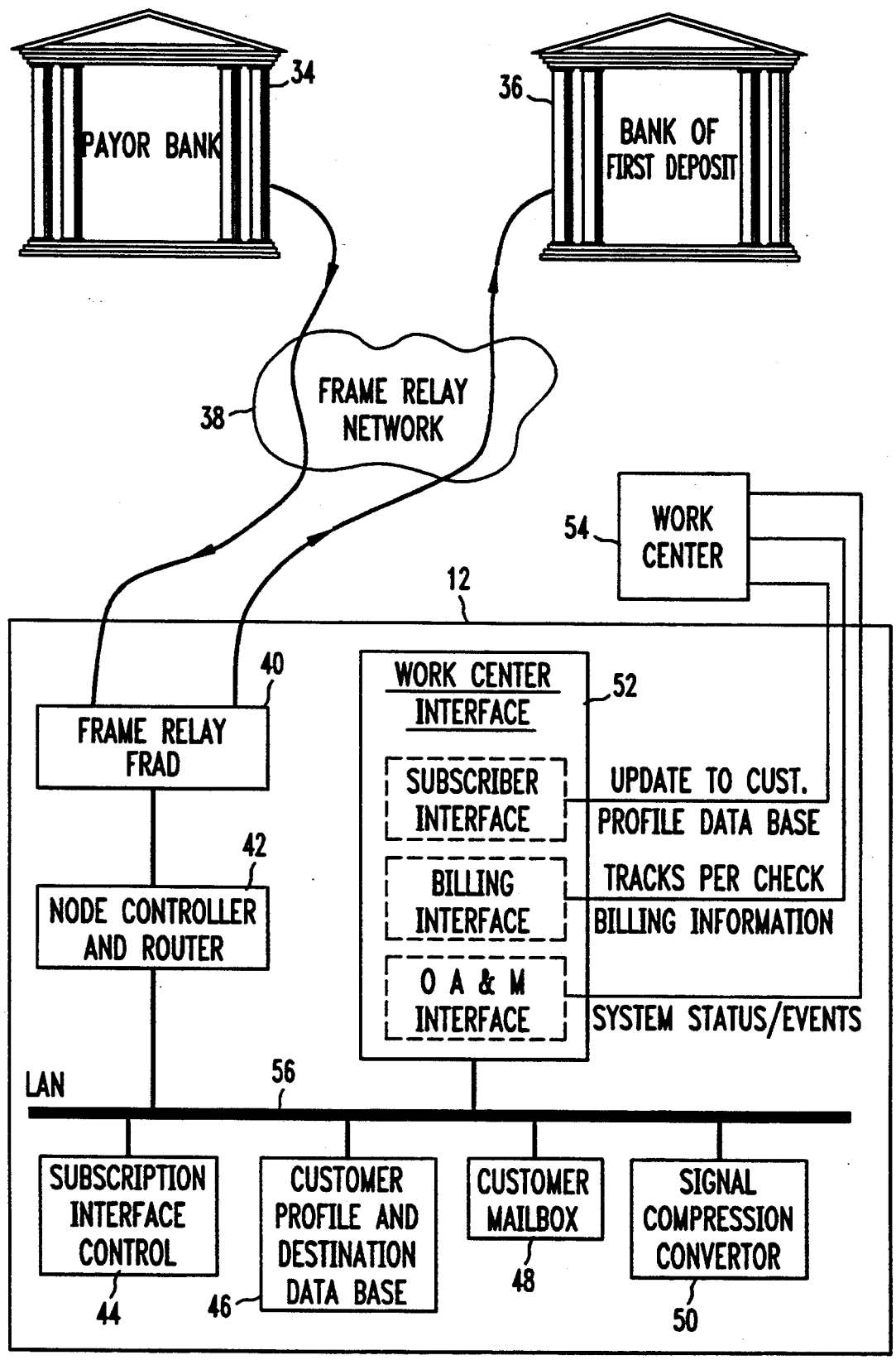
FIG. 2 is a more detailed diagram of specific examples of a public switched telephone network and a check image processing node both shown generally in FIG. 1.

FIG. 2 illustrates a detailed example of a check image processing node 12 like the one shown in FIG. 1. FIG. 2 also shows a specific public switched telephone network in which the node 12 is located. FIG. 2 is an example of the invention involving a situation where a payor bank 34, which is a subscriber to the services provided by the check image processing node 12, has dishonored a check sent to it directly or indirectly by a bank of first deposit 36. An image of the front and back faces of the dishonored check is generated by the payor bank 34 and sent to a public switched telephone network in the form of a frame relay network 38. The frame relay network 38 may be the frame relay network in the AT&T switched network. The image of the dishonored check is sent through an appropriate path in the network 38 to the check image processing node 12. The node 12 accepts the images transmitted over the frame relay network 38 and uses specific subscriber data to process check images and retransmit those images through the network 38 to their final destination.

The node 12 contains a frame relay assembler/disassembler 40 which receives frames of digital information representing check images sent by service subscribers to the network 38. The assembler/disassembler 40 also transmits frames of digital information representing check images to the network 38 after those images have been processed by the node 12. A node controller and router 42 controls the routing of check images to their intended destinations, both in the controller and to their ultimate destinations outside the network 38. The node 12 also contains a subscription interface control 44 which controls a network customer's access to the facilities in the node 12. A customer profile and destination database 46 contains information about subscribers to the services provided by the node 12 and information about all potential recipients of images handled by the node 12. A storage device 48, which may be an electronic mailbox as shown in FIG. 2, stores at least temporarily some or all of check images received by the node 12. A signal converter 50 contains information used by the node 12 to convert images in a format used by the sending institutions into a format understandable by the receiving institution. A work center interface 52 is connected to a work center 54. The interface 52 is involved with updating customer profiles, handling billing information, and accomplishing operations, administration, and maintenance functions. A local area network 56 connects the subsystems of the node 12 described above.

The frame relay assembler/disassembler 40 controls incoming and outgoing frames of digital information representing the images of the checks received in the node 12. When a check arrives at the node 12, the assembler/disassembler 40 will assemble the frames making up the image of the check. For example, there may be approximately 391 frames per check image, depending on the size and information content of the check. In addition to assembly of the frames making up check images, error detection and recovery operations may also be performed. The image of the check will then be passed to the node controller and router 42. The assembler/disassembler 40 may read certain overhead information accompanying the images, including frame relay flags, identifiers, address bits, indicators, and other overhead information. When check images leave the node 12 to go to their final destinations, the assembler/disassembler builds the frames making up each check image for transmission through appropriate portions of the frame relay network 38. The assembler/disassembler 40 may set flags, identifiers, indicators, and address bits under the control of the node controller and router 42.

The node controller and router 42 provides interfaces to systems external to the node 12. It is connected to all the other subsystems in the node 12 by way of the local area network 56. The controller 42 provides access to the database 46 and directs check images to appropriate subsystems in the node 12 connected to the local area network 56. The controller 42 also routes the check images from the node 12 to their ultimate destinations by way of the assembler/disassembler 40 and the frame relay network 38. The controller 42 may read some data accompanying check images, for example, it may identify that TCP/IP protocol information accompanying those images. That information may instruct the node 12 about the identity of the sending institution and the intended receiving institution. That information may also identify the disposition of the check, for example, it may indicate that the check is a return check dishonored by a payor bank. The controller 42 may signal the subscription interface controller 44 to extract data from the customer profile and destination database 46 which controls the processing performed on the check by the node 12. The controller 42 may receive instructions from the work center 54 through the interface 52 to control changes made to the information in the database 46. These changes may include the addition or changes to personal identification numbers or bank related data. The controller 42 may monitor, filter, and collect various alarms and signals from the subsystems connected to the local area network 56 to notify the work center 54 about various conditions in the node 12. High reliability may be achieved by the provision of various fault tolerant features in the node 12, for example, by the provision of appropriate backup equipment used when equipment in the node fails. The controller 42 accumulates certain statistics needed to prepare bills for telephone network users. For example, the controller 42 may count checks, keep track of functions performed by the node 12 (i.e., numbers of conversions, storage amounts, etc.) and the origins and destinations of the check images for billing purposes. This information is transmitted to a billing interface shown in the work center interface 52. The controller 42 may also be configured to handle information encrypted by sending institutions to provide security for the images transported by the network 38. The controller 42 may have its own encryption and decryption equipment to provide a secure environment in the node 12.

The subscription interface control 44 links the node 12 to a subscriber of the services provided by node 12. In addition to controlling a subscriber's access to the node 12, it controls the sending of information from the database 46 about the customer and the disposition and process requirements for each check to the controller 42. The control 44 may receive a login personal identification number and other security identifiers deemed necessary. It will check these against a customer profile and allow access to the node when they are correct. The control 44 checks a profile of a destination bank stored in the database 46 to determine how the check should be processed and stored. This information is transmitted to the node controller and router 42. The interface controller 44 controls all additions, deletions, and changes to the customer data in the database 46.

The database 46 contains two types of data, data relating to subscribers to the services of node 12 and data relating to banks and other potential destinations which do not subscribe to the services of the node 12. Examples of data which will be stored for each subscriber may include:
1. A personal identification number (PIN);
2. A subscriber's destination address which may be similar to those used in electronic funds transfer;
3. Information relating to protocols used by the equipment of the subscriber which creates the check images and information relating to any compression algorithms used by that equipment for transmitting images over the network;
4. Requirements of the subscriber regarding the storage of check images in the node;
5. Information about the times at which check images should be transmitted to the subscriber;
6. Default destinations to be used in the event that equipment on the subscribers premises should fail; and
7. Levels of subscriber service.

Data for nonsubscribers, for example, nonsubscription destination banks, are required because subscribers may wish to route check images to such non-subscribers. Data requirements for such entities may differ from those of subscribers. For example, non-subscribers may not have frame relay customer premises equipment, equipment to reconstruct the check images, or encryption devices to properly accept encrypted data. Check images may have to travel to such entities over normal switched access lines or a hard copy must be created to be physically sent to such entities. Data for non-subscribers may include:
1. A destination address similar to those used in electronic funds transfer;
2. A delivery code indicating the method of check delivery to be used, for example, a delivery code indicating whether frame relay or imaging equipment is available;
3. A fax number if delivery of check images is to be made by facsimile or a mailing address if delivery is to be made by post;
4. Storage requirements;
5. The time of day at which checks should be transmitted; and
6. A default destination in the event of a failure in the destination's premises equipment.

The storage device 48 may be a rewritable mass storage device which can at least temporarily store or archive compressed or uncompressed check images prior to transmission to their destinations. The storage means may be an optical disk drive or a magnetic disk drive depending on the needed file size and required access speed. A subscriber's check images will be stored in the storage device 48 if the subscriber elects this option. The customer will also specify a time-to-transmit threshold which is stored in the customer profile and destination database 46. This allows the customer to receive check images at convenient times of the day rather than sporadically. The customer may also elect to temporarily store check images during emergencies such as during a failure of the customer's premises equipment. The customer may also elect alternate delivery methods, such as facsimile or mail, when the customer's premises equipment fails. In addition to temporary storage of check images, the storage mechanism 48 may be configured to provide long term archiving of check images if elected by the customer. In one example of the invention, check images may be stored in the storage device 48 for a period of time sufficient to allow the item to clear normally. In all cases, the treatment of the check image by node 10 may be indicated in a customer profile stored in database 46, as described above.

Since there are no universally adopted standards regarding imaging formats and compression standards, the node 12 contains a signal converter 50 which converts signals received by the node 12 in one format used by a sender into another format usable by a recipient. The converter 50 uses information stored in the database 46 regarding the formats and compression algorithms involved. This information will be relayed from the database 46 to the signal converter 50 by the node controller 42. The converter 50 may contain multi-vendor image format and compression processors which can uncompress and reconstruct images from one imaging system to another.

The work center interface 52 provides external interfaces to the work center 54. The contents of the database 46 may be changed or updated through a subscriber interface in the interface 52. Service orders may be placed to accomplish this process. Certain aspects of a billing record may be produced by the node 12. For example, information about the number of checks processed, converted, stored, and transmitted will be maintained by the node controller 42. A billing interface in the interface 52 will periodically poll the node controller 42 for this information and will transmit this information to an appropriate downstream billing center. An operations, administration, and maintenance interface in the interface 52 will send all alarms, status checks, and reports of certain events to the work center 54.

In the example of the invention shown in FIG. 2, the payor bank 34 creates an image of each check it has dishonored. The image comprises a plurality of frames of digital information. The frames are sent to the node 12 in the frame relay network 38 and are assembled in the assembler/disassembler 40. The node controller and router 42 then may send the image to the storage device 48 and afterward read the image out of the storage device 48 and route it through the assembler/disassembler 40 and portions of the network 38 to a bank of first deposit 36 to notify that bank that the check has been dishonored. The behavior of the controller 42 in directing the check image to the storage device 48 and routing the image to its destination may be controlled by data accompanying the check image, data derived from the image, or data about the subscriber and the intended destination stored in the database 46. Although FIG. 2 has been described as a situation involving the return of dishonored check images from a payor bank to a bank of first deposit, the principles embodied in the circuitry shown in FIG. 2 may readily be applied to any situation requiring a transfer of a check image from one institution to another institution in the course of carrying out a check clearance procedure, including transferring check images in a forward flow path from a bank of first deposit to a payor bank.

In summary, this application describes a network based check clearing service which handles the routing, sorting, delivery, and storage of interbank check images to effectuate a check clearing procedure. The described method of clearing a check utilizing a public switched telephone network and images of checks may completely replace conventional check clearance procedures involving the physical transfer of checks between institutions. The described method may also be used in conjunction with actual physical transfer of checks to act as speedy notification of the flow of actual checks through the clearance system. Use of the described apparatus and method of clearing checks will have significant benefits for users. The entire notification process will be speeded up. The information available to payor banks, banks of first deposit, and intermediaries will be improved. The risks to the institutions will be reduced and the costs of processing checks will be lowered. Banks of first deposit will be able to improve customer service by the increased timeliness with which it notifies its deposition of dishonored checks.

We claim:

1. A public switched telephone network, comprising:
   at least one check clearance services node which receives an image of a check from a check clearance service subscriber connected to the network and routes that image to a recipient connected to the network;
   a storage device for storing a plurality of check images received by the node;
   a database containing information relating to each of the subscribers to the services provided by the node and information about potential recipients of check images from the node; and
   a node controller which is responsive to information contained in the database for storing check images in the storage device and routing check images to recipients through the public switched telephone network.

2. The apparatus of claim 1, in which the public switched telephone network comprises a public switched telephone network provided by a local exchange carrier.

3. The apparatus of claim 1, in which the public switched telephone network comprises a long distance public switched telephone network.

4. The apparatus of claim 1, in which the public switched telephone network comprises a long distance public switched telephone network accessed by way of a public switched telephone network provided by a local exchange carrier.

5. The apparatus of claim 1, in which the public switched telephone network is a packet network.

6. The apparatus of claim 1, in which the public switched network is a frame relay network.

7. The apparatus of claim 1, in which the public switched network is a circuit switched network.

8. The apparatus of claim 1, in which the subscriber is connected to the public switched telephone network by way of a dial up connection.

9. The apparatus of claim 1, in which the subscriber is connected to the public switched telephone network by a dedicated private connection.

10. The apparatus of claims 1, in which the subscriber is connected to the public switched telephone network by way of a digital connection operating at a bit rate of 2400 bits per second to about 1.544 megabits per second.

11. The apparatus of claim 1, in which the node comprises:
a means for storing information relating to customer profiles and destinations of check images.

12. The apparatus of claim 11, in which the node further comprises:
a means for storing images of checks for predetermined time periods.

13. The apparatus of claim 12, in which the node further comprises:
a means for controlling access to information in the storing means.

14. The apparatus of claim 1, in which the node comprises:
a means for convening signals produced by the subscriber in a first format to signals for the recipient in a second format.

15. The apparatus of claim 14, in which the convening means comprises:
a means for convening signals produced by the subscriber in accordance with a first encryption algorithm to signals encrypted in accordance with a second encryption algorithm for the recipient.

16. The apparatus of claim 1, in which the node comprises a node controller for controlling the operation of the node and for routing received check images to intended destinations in the node and in the public switched telephone network.

* * * * *